United States Patent
Hiratani et al.

[11] Patent Number: 5,914,068
[45] Date of Patent: Jun. 22, 1999

[54] BI-LAYER OXIDE FERROELECTRICS

[75] Inventors: Masahiko Hiratani, Akishima; Keiko Kushida, Kodaira; Kazushige Imagawa, Koganei; Kazumasa Takagi, Tokyo, all of Japan

[73] Assignee: Hitachi, Ltd., Tokyo, Japan

[21] Appl. No.: 08/765,575

[22] PCT Filed: Jun. 16, 1995

[86] PCT No.: PCT/JP95/01205

§ 371 Date: Dec. 30, 1996

§ 102(e) Date: Dec. 30, 1996

[87] PCT Pub. No.: WO96/00704

PCT Pub. Date: Jan. 11, 1996

[30] Foreign Application Priority Data

Jun. 30, 1994 [JP] Japan .................................. 6-148995

[51] Int. Cl.$^6$ .................................. C30B 29/22
[52] U.S. Cl. .................. 252/62.9 R; 117/4; 117/5; 117/6; 117/945; 501/134
[58] Field of Search ................. 252/62.9 R; 501/134; 117/945, 4, 5, 6

[56] References Cited

U.S. PATENT DOCUMENTS 5,519,566  5/1996  Perino et al. .................. 361/321.4
5,683,614  11/1997  Boyle .................. 252/62.9 R

OTHER PUBLICATIONS

"Structural Basis of Ferroelectricity in the Bismuth Titanate Family", R.E. Newnham, R.W. Wolfe and J.F. Dorrian, Materials Research Laboratory, pp. 1029–1039, vol. 6, No. 10, Jul. 28, 1971.

Ikegama et al, "Piezoelectricity in Ceramics of Ferroelectrics Bismuth Compound with Layer Structure" Jpn. Jr. of App. Phy. vol. 13, No. 10 Oct., 1975.

Primary Examiner—Robert Kunemund
Attorney, Agent, or Firm—Antonelli, Terry, Stout & Kraus, LLP

[57] ABSTRACT

Novel Bi-layer Perovskite ferroelectrics constituted of BiO intermediate layers (17) and pseudo-Perovskite layers (18) stacked alternately are disclosed. The Bi-layer Perovskite ferroelectrics have such a crystal structure which has a fundamental skeleton composed of each intermediate layer (17) consisting of one BiO plane and each pseudo-Perovskite structure (18) consisting of $Pb(Zr, Ti)O_3$. Since the intermediate layer (17) is constituted of the BiO layer, the ferroelectrics are more excellent in ferroelectric characteristics and thermodynamic stability than known Perovskite ferroelectrics comprising a $Bi_2O_2$ layer.

37 Claims, 3 Drawing Sheets

CYCLE OF FERROELECTRIC HYSTERESIS
FOR IN LOG SCALE

FIG. 4

BI-LAYER OXIDE FERROELECTRICS

TECHNICAL FIELD

This invention relates to Bi-layer oxide ferroelectrics and more particularly, to Bi-layer oxide ferroelectrics which are particularly useful as capacitors, ultrasonic oscillators and the like and also to a method for making such Bi-layer oxide ferroelectrics in high accuracy.

BACKGROUND ART

Known oxide ferroelectrics which are employed as capacitors and transducers include, for example, Pb(Zr,Ti)$O_3$ having the Perovskite structure and Bi-layer Perovskite compounds.

The term "Perovskite structure" used herein is intended to mean a crystal structure represented by the general formula, $ABO_3$, wherein the $BO_6$ oxygen octahedra with consists of six-coordinated octahedra of oxygen ions (O) about a given cation (B) undergo mutual corner sharings to form a three-dimensional fundamental structure in such a way that the resultant spaces are occupied with another type of cation (A). The above-indicated Pb(Zr,Ti)$O_3$ represents a compound having the Perovskite structure wherein Pb corresponds to the A ion and the (Zr, Ti) corresponds to the B ion. In the above formula, the parentheses ( ) mean that at least one element selected from the elements included in the parentheses should be principally contained. It is a matter of course, however, that if a mixing ratio is defined, the elements being mixed are contained in such a compositional ratio.

Moreover, the term "layer Perovskite structure" is intended to mean a crystal structure wherein pseudo-Perovskite structures and intermediate layers (i.e. a layer intercalated between adjacent pseudo-Perovskite structures) are alternately located, as having such a structure as of pseudo-Perovskite structure/intermediate layer/pseudo-Perovskite structure/intermediate layer/ . . . , at a given period in one direction. The term "pseudo-Perovskite structure" means a structure which fundamentally consists of a Perovskite structure but whose elemental ratios are not exactly represented by $ABO_3$ because the pseudo-Perovskite structure is invariably contiguous to the intermediate layers.

Further, the term "Bi-layer Perovskite structure" means such an intermediate layer as mentioned above wherein the cation in the intermediate layer consists of Bi. For instance, known compounds having a typical layer Perovskite structure include $(Bi_2O_2)(A_{n-1}B_nO_{3n+1})$. In this instance, the intermediate layer consists of $(Bi_2O_2)$ and the pseudo-Perovskite structure consists of $(A_{n-1}B_nO_{3n+1})$. The suffix, n, means that corner-shared $BO_6$ oxygen octahedral are stacked n times within the pseudo-Perovskite structure along the direction wherein the pseudo-Perovskite structures and intermediate layers are alternatively located.

Figure 1A:
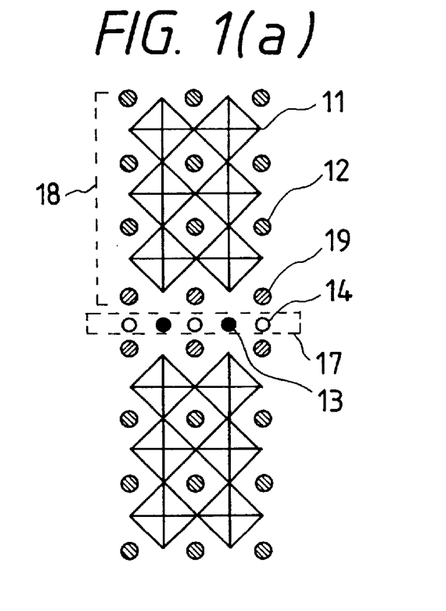
FIG. 1(a) is a schematic view showing a Bi-layer Perovskite structure according to the invention.
Figure 1B:
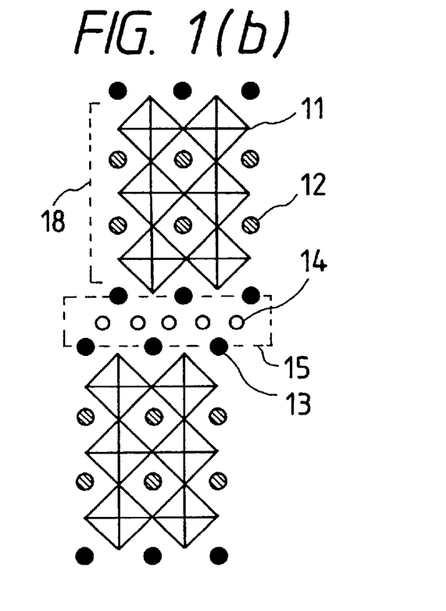
FIG. 1(b) is a schematic view showing a known Bi-layer Perovskite structure.

FIG. 1(b) is a schematic projection view of a crystal structure, as viewed from the side of the layer, of a Bi-layer Perovskite compound of the formula wherein n=3, $(Bi_2O_2)$ $(A_2B_3O_{10})$. In the figure, rectangles 11 each having a "cross" symbol therein, respectively, represent a $BO_6$ octahedron formed by oxygen ions octahedrally coordinated about the B ion. These $BO_6$ octahedra are three-dimensionally shared at the corners thereof to form a pseudo-Perovskite structure 18. The space between the adjacent $BO_6$ oxygen octahedra 11 is occupied with an A ion 12. A region surrounded by a dotted line 15 indicates a $Bi_2O_2$ intermediate layer isolating adjacent pseudo-Perovskite structures 18 from each other. This intermediate layer is constituted of Bi ions 13 and O ions 14.

A pure Perovskite structure has elemental ratios of A:B:O of 1:1:3. With the pseudo-Perovskite structure, the elemental ratios are n−1:n:3n+1, disenabling one to express the elemental composition as $ABO_3$. As having set out hereinbefore, this is because the pseudo-Perovskite structures and the intermediate layers adjoin each other at a given period. As will be apparent from FIG. 1(b), the sites to be occupied by the A ions 12 are occupied by the Bi ions 13.

The compounds of the afore-indicated formula wherein n=2 are known including those compounds wherein A is an element selected from Pb, Ba and Sr, and B is at least one element selected from Nb and Ta. These compounds may be represented by $Bi_2O_2.AB_2O_7$ or $ABi_2B_2O_9$.

As a compound wherein n=3, there is known a compound wherein A is Bi and B is Ti. In this case, the composition can be represented by $Bi_2O_2.Bi_2Ti_3O_{10}$ or $Bi_4Ti_3O_{12}$.

Known compounds wherein n=4 include ones wherein A consists of an element selected from Sr, Ba and Pb, and Bi, and B is Ti. The composition of the compound can be represented by $Bi_2O_2.ABi_2Ti_4O_{13}$ or $Bi_4Ti_4O_{15}$.

It will be noted that this kind of Bi-layer Perovskite compound is set forth, for example, in Meter. Res. Bull., 6(1971), pp. 1029.

Oxide ferroelectrics having the Perovskite structure represented by the formula, $PbZr_xTi_{1-x}O_3$, are in the form of a solid solution wherein the mixing ratio between $PbTiO_3$ and $PbZrO_3$ is x:1−x. When the mixing ratio is changed by changing x from 0 to 1, physical constants, such as spontaneous polarization, coercive field, dielectric constant and piezoelectric constant, can be, respectively, changed as desired, thereby enabling one to obtain desired values of ferroelectric characteristics, a dielectric characteristic, piezoelectric characteristics and the like. Especially, in the vicinity of x=0.54, the coercive field is minimized and the spontaneous polarization is maximized, so that such an oxide ferroelectric material exhibits the most excellent ferroelectric characteristics when used as a capacitor.

The Bi-layer Perovskite compounds represented by the formula, $Bi_2O_2.A_{n-1}B_nO_{3n+1}$, exhibits great anisotropy of the crystal structure as mentioned above and thus, have great anisotropy with respect to the ferroelectric characteristics. For instance, with the compound represented by the formula, $Bi_2O_2.Bi_2Ti_3O_{10}$ or $Bi_4Ti_3O_{12}$ wherein n is 3, A is Bi and B is Ti, the spontaneous polarizations along the directions parallel to and vertical to the layers are, respectively, 50 $\mu C/cm^2$ and 4 $\mu C/cm^2$ and differ from each other on the order of magnitude, thus showing remarkable anisotropy. The compounds exhibit great anisotropy with respect to the electromechanical coupling factor. The use of the compound, for example, as a transducer comprising an ultrasonic oscillator is advantageous in a small limitation on the width-to-thickness ratio.

Moreover, the compounds has the feature that the coercive field is small to allow easy polarization along the direction of stacking. In addition, the Bi-layer structure is unlikely to suffer degradation of spontaneous polarization resulting from the polarization hysteresis cycles. This is because the pseudo-Perovskite structure from which ferroelectric characteristics are derived is buffered with the $Bi_2O_2$ intermediate layer at a molecular level, so that the mechanical strain in the crystals accompanied by the polarization hysteresis is absorbed.

On the other hand, however, with known Bi-layer Perovskite compounds shown in FIG. 1(b), the pseudo-Perovskite structures 18 are so arranged as to glide, through the intermediate layer 15 consisting of the $Bi_2O_2$, by half a period within a plane parallel to the $Bi_2O_2$ layer 15. Accordingly, the unit cell of the crystal lattices vertical to the $Bi_2O_2$ layer 15 is, for example, as great as 2.6 nm for n=2, 3.3 for n=3, and 4.2 nm for n=4.

Such a long-range period structure not only takes a long time for the reaction at thermal equilibrium, but also presents the problem that lattice defects are liable to be introduced into the crystals. Further, the $Bi_2O_2$ layer 15 restricts the size of the unit cell within a plane parallel to the layer. Eventually, the lattice constant is limited to a value as small as 0.54 nm to 0.55 nm (when defined as a pseudo-tetragonal system). Accordingly, the ion used as the B ion is limited to one having a small ionic radius such as Ti, Nb or Ta. In fact, there has not been obtained any compound, wherein part or all of the B ion is replaced by Zr, such as a solid solution, $Pb(Zr, Ti)O_3$, consisting of $PbTiO_3$ and $PbZrO_3$.

If novel types of Bi-layer Perovskite ferroelectric compounds which comprise both $Pb(Zr,Ti)O_3$ structures having good ferroelectric characteristics and Bi intermediate layers capable of imparting various characteristic features to the compounds are obtained, wide utility will be expected not only in the fields of their preparation and methods for making thin films, but also in applications thereof as capacitors, ultrasonic oscillators and the like.

DISCLOSURE OF THE INVENTION

It is accordingly an object of the invention to provide Bi-layer oxide ferroelectrics which can overcome the above-stated problems involved in the known counterparts and which ensure desired physical properties along with good ferroelectric characteristics.

It is another object of the invention to provide a method for preparing Bi-layer oxide ferroelectrics by a simple manner and in high accuracy or yield.

In the practice of the invention, Bi-layer oxide ferroelectrics are so arranged that the intermediate layers are each made of BiO, not $Bi_2O_2$, so that the pseudo-Perovskite structure has a composition represented by $Pb_{n-1}(Zr, Ti)_nO_{3n+1}$ and the intermediate layer is made of BiO.

With a known Bi-layer Perovskite compound of the formula, $Bi_2O_2.A_{n-1}B_nO_{3n+1}$, shown in FIG. 1(b), the intermediate layer 15 consists of two Bi ionic planes and one O ionic plane such as Bi ionic plane 13/oxygen ionic plane 14/Bi ionic plane 13.

Figure 1C:
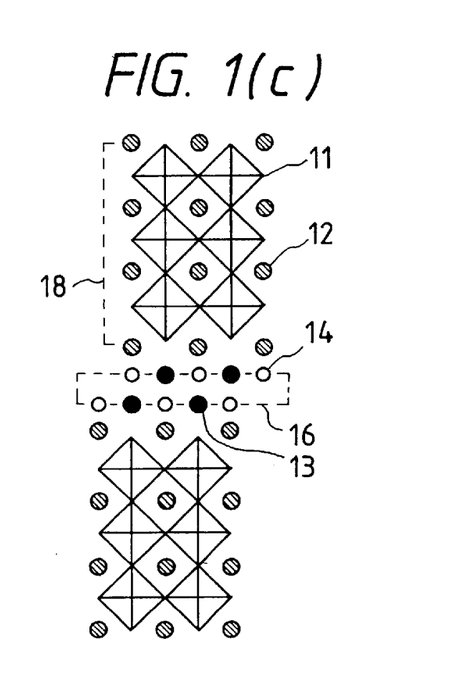
FIG. 1(c) is a schematic view showing a conceivable Bi-layer Perovskite structure.

On the other hand, another type of Bi-layer Perovskite structure is known as having $Bi_2O_2$ intermediate layers each having copper as the B ion. This structure is shown in FIG. 1(c). A ($Bi_2O_2$) intermediate layer 16 differs from that shown in FIG. 1(b) with respect to the arrangement of the Bi ions 13 and the O ions 14. The $Bi_2O_2$ intermediate layer 16 consists of two Bi-O planes forming the NaCl structure. Additionally, the arrangement of the intermediate layer 16 relative to the pseudo-Perovskite structure 18 is different from that of FIG. 1(b). More particularly, with the case of FIG. 1(b), the plane including the Bi ions 13 of the intermediate layer 15 is adjacent to the $BO_6$ oxygen octahedra 11 of the pseudo-Perovskite structure 18. In FIG. 1(c), the Bi-O plane of the intermediate layer 16 and A ions 12 of the pseudo-Perovskite structure adjoin each other. This difference results in a higher compositional ratio of the A ions, with the result that the pseudo-Perovskite structure 18 has a composition represented by the formula, $A_{n+1}B_nO_{3n+1}$.

Attempts have been made to prepare compounds which have $Bi_2O_2$ intermediate layers 16 as shown in FIG. 1(c) and Ti ions as the B ions. However, with the structures shown in FIGS. 1(b) and 1(c), the ratio between the B ions and the Bi ions is 2:n for both structures, thus it being inevitable to form a more stable, known compound as shown in FIG. 1(b). The Bi-layer Ti Perovskite structure shown in FIG. 1(c) cannot be obtained.

Tl-layer Perovskite compounds wherein copper is contained as the B ion and the intermediate layer is made of TlO are known in the art. The Bi-layer Perovskite compound which is formed by substituting the (TlO) intermediate layer with a BiO-layer intermediate layer is shown in FIG. 1(a).

In this structure, an intermediate layer 17 consists of one Bi-O ionic plane. Like the structure shown in FIG. 1(c), the Bi-O plane is adjacent to the A ionic plane in the pseudo-Perovskite structure.

Two great differences are observed between the structure shown in FIG. 1(a) and the structures shown in FIG. 1(b) and 1(c).

The first difference resides in that the relative positional relations between the pseudo-Perovskite structures through the Bi intermediate layer differ from each other. More particularly, with the structure shown in FIG. 1(a), the $BO_6$ oxygen octahedra located above the intermediate layer 17 are positioned just above the oxygen octahedra located beneath the BiO intermediate layer 17. On the other hand, with the structures shown in FIGS. 1(b) and 1(c), the oxygen octahedra arranged above the $Bi_2O_2$ intermediate layers 15, 16, respectively, are located at a position shifted by half a period on comparison with the oxygen octahedra arranged below the intermediate layers 15, 16. This is true of the direction vertical to the sheet of the drawings.

The second difference is as follows. The Bi-layer Perovskite compounds shown in FIG. 1(a) are represented by the formula, $BiO.A_{n+1}B_nO_{3n+1}$ wherein the ionic ratios of Bi:A:B is 1:n+1:n. The ionic ratios completely differ from those ionic ratios of 2:n−1:n in the compound shown in FIG. 1(b). In view of these differences, the structure shown in FIG. 1(a) is a novel, ferroelectric Bi-layer Perovskite structure. Because of the difference in the elemental ratios, a highly pure compound can be obtained with little or no possibility that the compound shown in FIG. 1(b) is incorporated.

The composition of the Bi-layer Perovskite compound shown in FIG. 1(a) is represented by the formula, $BiO.A_{n+1}B_nO_{3n+1}$. Assuming that $Pb_{n-1}(Zr, Ti)_nO_{3n+1}$ having good ferroelectric characteristics is used as the pseudo-Perovskite structure 18, i.e. where the divalent Pb ion is used as the A ion and the tetravalent Ti and/or Zr ion is used as the B ion, the Bi ion is trivalent and, thus, ionic valence of +(2n+1) in total are assigned to the (n+1) A ions 12 based on the electric neutrality. The +(2n+1) ionic valence cannot be uniformly assigned to (n+1) divalent Pb ions.

For this reason, the A ions are assumed to be located at two crystallographically-distinct sites for (n−1) A ions 12 in the pseudo-Perovskite structure surrounded by the $BO_6$ oxygen octahedra and two A ions 19 in the pseudo-Perovskite structure adjacent to the Bi-O plane. More particularly, the A ions are divided into two categories include (n−1) divalent Pb ions 12 in the pseudo-Perovskite structure surrounded by the $BO_6$ oxygen octahedra and A' ions 19 in the pseudo-Perovskite structure adjacent to the Bi-O plane.

When the formula, $BiOA_{n+1}B_nO_{3n+1}$, is converted according to the above assumption, $BiOA'_2Pb_{n-1}(Zr,Ti)_nO_{3n+1}$ is obtained. More specific formulas include:

$BiOA'_2Pb(Zr,Ti)_2O_7$ for n=2;

$BiOA'_2Pb_2(Zr,Ti)_3O_{10}$ for n=3;

and $$BiOA'_2Pb_3(Zr,Ti)_4O_{13} \text{ for } n=4.$$

Among the +(2n+1) ionic valence in total assigned to all the A ions, the +2(n−1) charges assigned to (n−1) Pb ions are subtracted from the overall charges of +(2n+1). Thus, an ionic valence of +3 is assigned to A2', so that A' is (Ba, K) wherein the ratio between Ba and K is 1:1, or $La_{0.5}$. Since both Ba and K have an ionic radius greater than Pb, preferential occupation of these elements at the sites for the A' ion takes place. This is the reason why these elements are used for this purpose. La occupies only the half of the A' ion sites, while leaving the other half as a lattice defect. Like Ba a nd K, La is selected for the reason that it has the greatest ionic radius.

When n is 5 or above, little difference is obtained among compounds with different values of n with respect to the free energy, making it difficult to isolate an intended compound therefrom. This is why n is determined as 4 or below. When n=1, a pseudo-Perovskite structure containing Pb is not formed. Thus, n is 2 or above.

It will be noted here that FIGS. 1(a) to 1(c) are, respectively, a schematic projection view of a crystal structure wherein the crystal strain inherent to Perovskite ferroelectrics is omitted and the $BO_6$ oxygen octahedra and the unit cells are, respectively, depicted as an ideal shape with high symmetry. Although minute crystal strains are not shown at all, the fundamental framework of the crystals of the Bi-layer oxide ferroelectrics of the invention will be apparent from FIG. 1.

The Bi-layer oxide ferroelectrics of the invention shown in FIG. 1(a) have good ferroelectric characteristics as set out hereinafter. The use of the Bi-layer oxide ferroelectrics ensures the fabrication of ferroelectric devices, such as capacitors, ultrasonic oscillators and the like, which have characteristics better than known counterparts.

With the Bi-layer Perovskite structure of FIG. 1(b) having known $Bi_2O_2$ intermediate layers 15, the pseudo-Perovskite structure 18 is dominated by means of the $Bi_2O_2$ intermediate layer wherein the size of the unit cell of the crystal lattices within a plane parallel to the $Bi_2O_2$ intermediate layer is regulated. More particularly, two Bi ionic planes 13 constituting the $Bi_2O_2$ intermediate layer 15 keep substantially the same coordination relation as the A ions 12 with respect to the $BO_6$ oxygen tetrahedra in the pseudo-Perovskite structure 18. Additionally, the two Bi planes 13 are bonded with one O plane 14, so that the $Bi_2O_2$ intermediate layer 15 restricts the $Bi_2O_2$ intermediate layer 15 itself and the pseudo-Perovskite structure 18 through strong chemical bonding. Accordingly, the value of the lattice constant within a plane parallel to the $Bi_2O_2$ intermediate layer 15 is limited, in fact, is merely in the range of 0.54 nm to 0.55 nm when regarded as a tetragonal system. This means that the degree of freedom for designing the pseudo-Perovskite structure 18 is so small that it becomes difficult to impart a desired strain to the crystal lattice, which is the most fundamental factor for designing ferroelectric compounds.

On the other hand, with the BiO intermediate layer 17 used in the present invention, one Bi-O plane 13, 14 exists in the crystal lattices as a structural unit which is independent of the pseudo-Perovskite structure 18. The bonding in the BiO intermediate layer 17 is not so three-dimensional as in the case of the $Bi_2O_2$ intermediate layer 15. Thus, the BiO intermediate layer 17 is weak in factor to dominate the lattice constant within a plane parallel to the layer of the pseudo-Perovskite structure 18. The lattice constant is determined depending greatly on the bond length in the pseudo-Perovskite structure 18. With $Pb(Zr, Ti)O_3$, as the ratio of Zr increases, the lattice constant varies from 0.55 nm to 0.58 nm. In the case of the known structure shown in FIG. 1(b), the lattice constant of the $Bi_2O_2$ intermediate layer 15 is limited to 0.55 nm or below. The elimination of this limitation is one of the great advantages of the BiO-layer Perovskite compounds of the invention, with desired characteristics being ensured.

As will be apparent from FIG. 1(b), the lattice constant of the known $Bi_2O_2$ intermediate layer 15 along the direction of c axis (i.e. the stacking direction of the layers) becomes double owing to the gliding within the plane of the pseudo-Perovskite structures 18 sandwiching the known $Bi_2O_2$ intermediate layer 15 therebetween.

In this connection, however, no gliding of the lattices sandwiching the BiO plane therebetween takes place in the BiO intermediate layer 17 of the invention. Accordingly, the lattice constant along the direction of c axis does not become double.

Where n increases from 2 to 4, the lattice constant containing the $Bi_2O_2$ intermediate layer 15 changes from 2.6 nm to 4.2 nm. In contrast, with the BiO intermediate layer 17 as in the present invention, the change of the lattice constant ranges from 1.3 nm to 2.1 nm, which is only the half of the value changed in the $Bi_2O_2$ intermediate layer 15.

In the practice of the invention, the period in the direction of c axis is so small that the stability of the lattice is high, with the attendant advantages that it is easy to synthesize and lattice defects are small in number.

Like the case of $Pb(Zr,Ti)O_3$, partial substitution of elements in the BiO-layer Perovskite structure is possible. When part of Pb ion is replaced by La ion, the coercive field can be reduced. For instance, when the Pb ion is partially substituted with 5% of La ion in BiO-layer ferroelectrics wherein n=3, the coercive field lowers by several kilovolts/cm. The substitution limit is greater for a thin film. When the substitution arrives at 10% or above, the precipitation of other phases has been apparently confirmed through X-ray diffraction analysis.

(Zr,Ti) may be replaced by (Nb, Ta). When (Zr, Ti) ions in BiO-layer ferroelectrics wherein n=3 are partially substituted with Nb ions by 3%, the coercive field likewise lowers by several kilovolts/cm. The substitution limits is approximately 10% as in the above case.

The Bi-layer oxide ferroelectric compounds of the invention can be readily formed by any known processes including, for example, ceramic syntheses such as powder synthesis, a sol-gel method and the like, and various thin film growth techniques such as chemical vapor deposition, sputtering, reactive co-evaporation, pulsed laser deposition and the like techniques.

In order to obtain compounds which a reduced content of other phases or whose crystals are more properly oriented, it is preferred to use the following procedure.

Initially, $Pb_{n-1}(Zr, Ti)_nO_z$ having a desired composition is synthesized as a precursor. Although it is not always necessary that the precursor have exact Perovskite composition ratios, it is important that phases slightly different from that of the Perovskite structure be mutually uniformly mixed.

Subsequently, a Bi oxide and an A' oxide such as, for example, $Bi_2O_3$, $La_2O_3$, $K_2O$, BaO or the like are mixed with the precursor at predetermined compositional ratios and reacted to obtain a Bi-layer oxide ferroelectric compound composed of a pseudo-Perovskite structure consisting of $Pb(Zr, Ti)O_3$ and a an intermediate layer consisting of BiO in high yield.

Similar results are obtained when $A'_2Pb_{n-1}(Zr, Ti)_nO_2$ is provided as a precursor and mixed with $Bi_2O_3$ at a predetermined compositional ratio and reacted.

For the thin film formation of the layer Perovskite structure compound having the BiO intermediate layers, a layer-by-layer film growth procedure (i.e. a method for forming a film by successively stacking layers one by one) is also effective. The Bi-layer structure exhibits intense anisotropy of crystals. In other words, the crystal structure predominantly develops two-dimensionally, so that it can be considered that the crystal structure is constituted by superposing atomic planes parallel to the layer.

For instance, while the complete formation of individual atomic layers is confirmed through RHEED (reflection high energy electron diffraction) to exactly control the crystal growth, multiple atomic layers are successively stacked or superposed, like $BiO/(K, Ba)O/(Zr, Ti)O_2/PbO/(Zr, Ti)O_2/(K,Ba)O/BiO$..., according to the CVD process, the pulsed laser deposition process or the oxide molecular beam epitaxy process, thereby efficiently forming a thin film of a Bi-layer oxide ferroelectric compound.

For the preferential orientation of crystal grains of the Bi-layer ferroelectrics of the invention, there may be used a method wherein the crystal grains are sintered at high temperatures while applying a compression pressure thereto.

When compression pressure is applied to an aggregate of crystal grains whose crystal structure is anisotropic, the crystals are preferentially oriented owing to the intergranular or intraglanular gliding. Accordingly, since the compound of the invention has a crystal structure which is anisotropic in nature, the Bi-layer structure is formed by stacking along the direction of a pressure being applied.

For the formation of an oriented thin film where the BiO layer is grown in a direction vertical to a substrate plane, the following method is effective.

This method is one wherein the Bi-layer compound is formed at a high growth rate of 30 nm/minute, for example. In the case, supersaturating growth takes place because of the excessive supply of cations such as Bi. Eventually, the BiO layer is likely to grow vertically to the substrate plane.

In order to permit similar orientation growth at a slow growth rate, for example, of 1 nm/minute, it is effective to use a method wherein light rays ranging from IR to UV regions are irradiated on the surface of the substrate on which a thin film is being grown. When the light is discontinuously irradiated under which a thin film is grown while repeatedly rapidly heating and cooling the growth surface, the crystal growth is carried out under supercooling conditions. Consequently, the Bi layer is likely to grow vertically to the substrate surface.

The orientation method using the light irradiation is effective for forming the BiO layer by coating like a sol-gel method. In the method, a coating film having a thickness of about several tens of namometers is first formed and is discontinuously irradiated with light, followed by rapid heating and cooling to permit crystallization. By the above procedure, the oriented nuclei wherein the BiO layer is vertical to the substrate plane are formed.

The thin film formation method may be either a sol-gel method or an ordinary thin film formation method. Once the oriented nuclei have been formed, subsequent film growth proceeds in such a way that the thin film is entirely grown in a direction vertical to the substrate plane without further light irradiation.

BEST MODE FOR CARRYING OUT THE INVENTION

EXAMPLE 1

Bi-layer Perovskite compounds were formed according to ordinary powder synthesis and a sintering process.

Metal oxide powders of guaranteed reagents (with a purity of 99.5% or above) including $Bi_2O_3$, $BaCO_3$, $K_2CO_3$, $PbO$, $ZrO_2$ and $TiO_2$ were weighed in amounts sufficient to provide compounds of the formula, $BiO(Ba_{0.5}K_{0.5})_2Pb_{n-1}(Zr_{0.5}, Ti_{0.5})_nO_{3n+1}$ wherein n=2, 3 or 4.

Subsequently, a mixed powder of these metal oxides was placed in a polyethylene pot along with zirconia balls, followed by immersion in acetone, uniform mixing for about 12 hours and drying in a drying over at 200° C. for 5 hours. The resultant powder was pressed into a pellet by means of a cylindrical press machine at a compression pressure of about 0.9 tons/cm².

The resultant pellet was placed in an alumina crucible and calcined in air at 850° C. for 2 hours, followed by pulverization and mixing in an automated motar. The calcination and mixing procedure was repeated three times in total. The resultant powder was press molded into a disk having a diameter of 10 mm and a thickness of 5 mm by application of a compression pressure of 2 tons/cm² in a cylindrical pressing die, followed by sintering in air at 1050° C. for 1 hour to obtain intended compounds.

The thus obtained compounds were pulverized and subjected to powder X-ray diffraction analysis, revealing that any specific other phase or impurity was not recognized. With respect to all the compounds of the formula wherein n=2, 3 and 4, diffraction lines showing the layer Perovskite structure were observed. The lattice constants were found to be a=0.56 nm and c=1.3 nm for n=2, a=0.56 nm and c=1.7 nm for n=3, and a=0.56 nm and c=2.1 nm for n=4.

EXAMPLE 2

This example illustrates the formation of a Bi-layer Perovskite thin film using an RF magnetron sputtering technique.

In the same manner as in Example 1, there was obtained a sintered target which had a composition represented by the formula, $BiO(La0.5)_2Pb_2Ti_3O_{10}$ (elemental ratios of Bi:La:Pb:Ti=1:1:2:3) and had a diameter of 30 mm. A 10 mm square MgO (100) single crystal which had been covered with a 120 nm thick platinum electrode was provided as a substrate. Growth conditions included a heater temperature of 700° C., a discharge gas/oxygen gas pressure ratio, $Ar/O_2$, =90/10, a total pressure of 5 mTorr, an incident power of 1.5 W/cm², and a growth rate of 5 nm/minute.

Several thin films were made under the same conditions, and some films were so formed that the Bi layer was grown vertically to the substrate plane by irradiation of an exicimer laser on the surface of the substrate during sputtering. The laser irradiation conditions included an energy density of 2 mJ/cm², and a repetition rate of 10 Hz, a wavelength of 248 nm, and the entire surfaces of the substrate were irradiated as an irradiation area.

The identification of a grown compound and the orientation of a thin film relied on an X-ray diffraction method. Several non-assignable X-ray diffraction lines (i.e. diffraction lines with which any substance could not be identified) were observed. However, the intensity ratio of these unknown diffraction lines to the diffraction lines of an intended compound was not greater than 0.5%, demonstrating that the formation of compounds whose compositions were unknown was negligible in practical applications.

When determined by analysis through the ICPS method (inductively coupled plasma spectroscopy), the compositional ratios of the cations in the film were found to be such that Bi:La:Pb:Ti=0.98:1:1.97:3. These ratios were coincident with those of the target within a range of measuring accuracy.

Where sputtering was conducted without irradiation of any laser beam, the c axis became vertical to the MgO substrate plane. On the other hand, where sputtering was carried out while irradiating a laser beam, the c axis became parallel to the substrate plane. In this manner, a thin film (with a thickness of 200 nm) was oriented and grown. When the film was thick enough to neglect the influence of the lattice mismatching with the substrate, the lattice constants of the thin film were such that a=0.54 nm and c=1.6 nm.

EXAMPLE 3

This example illustrates synthesis of a Bi-layer Perovskite compound from $Pb_{n-1}(Zr_{0.7}, Ti_{0.3})_nO_z$ precursor.

The powder of the precursor was synthesized according to a hot pressing method. PbO, $TiO_2$ and $ZrO_2$ were, respectively, weighed for the cases where n=2, 3 and 4, followed by uniform mixing for 2 hours by use of an automated agate mortar.

The resultant mixed powder was subjected to reaction in a hot pressing machine at 1200° C. for 2 hours in an atmosphere of oxygen at a pressure of 120 kg/cm² to obtain the precursor.

The results of the analysis of the resultant powder of the precursor through X-ray diffraction, from which a mixed phase which was considered to consist of pseudo-tetragonal Pb $(Zr,Ti)O_3$, $ZrO_2$ and $TiO_2$ was recognized.

Subsequently, $Bi_2O_3$, $BaCO_3$ and $K_2CO_3$ were added to the powder in predetermined amounts sufficient to provide $BiO(Ba_{0.5}, K_{0.5})_2Pb_{n-1}(Zr_{0.7}, Ti_{0.3})_nO_{3n+1}$, followed by charging into a polyethylene pot along with zirconia balls while using acetone as a mixing solvent and uniform mixing for about 12 hours.

After drying in a drying oven at 200° C. for 5 hours, the powder was pressed into a cylindrical pellet and reacted in air at 850° C. for 2 hours. The pulverization with an automated mortar and the uniform mixing in the ball mill were repeated three times in total. The resultant powder was applied with a pressure of 2 tons/cm² by use of a cylindrical pressing die to obtain a disk having a diameter of 10 mm and a thickness of 5 mm, followed by further sintering in air at 1050° C. for 1 hour to obtain each intended compound.

The powders of the thus obtained compounds was analyzed according to an X-ray diffraction technique, revealing that the full width at the half maximum of the resultant diffraction line was about 70% of that of a diffraction line of the compound obtained without use of any precursor. This means that preferential occupations of the ions in the BiO intermediate layers and the pseudo-Perovskite structures are, respectively, more pronounced.

It was also confirmed that all the diffraction lines were assigned to the Bi-layer Perovskite structure. The lattice constants were such that a=0.57 nm and c=1.3 nm for n=2, a=0.57 nm and c=1.7 nm for n=3, and a=0.57 nm and c=2.1 nm for n=4.

EXAMPLE 4

This example illustrates the formation of a Bi-layer oxide ferroelectric compound of the invention using a sol-gel method.

Zirconium nitrate, lead acetate, bismuth nitrate, lanthanum nitrate and titanium tetrabutoxide were weighed in amounts sufficient to provide a compound of the formula, $BiOLaPb_{n-1}(Zr_{0.3}, Ti_{0.7})_nO_{3n+1}$ wherein n=2, 3 or 4, followed by dissolution in a mixed solvent of triethylene glycol and acetic acid and agitation in an atmosphere of nitrogen gas for 10 hours.

A silicon substrate on which a platinum film had been formed on the surface thereof by vacuum deposition was immersed in the mixed solvent dissolving the respective components such as lanthanum nitrate and drawn up at a constant rate of 4 cm/minute.

After drying in air for 5 minutes, the immersed substrate was dried at 80° C. for 2 hours, heated to 500° C. at a rate of 2° C./minute, kept at 500° C. for 1 hour and then heated to 750° C. at a rate of 4° C./minute, followed by heating at 750° C. for 5 hours to form an approximately 150 nm thick film of an intended compound.

The thus formed film was subjected to X-ray diffraction analysis, revealing that all diffraction lines were assigned to the Bi-layer Perovskite structure and thus, an intended compound was formed. The lattice constants were as follows: a=0.55 nm and c=1.3 nm for n=2; a=0.55 nm and c=1.6 nm for n=3; and a=0.55 nm and c=2.0 nm for n=4.

EXAMPLE 5

This example illustrates the formation of a thin film of Bi-layer oxide ferroelectric compound of the formula, BiO $(Ba, K)_2Pb_{n-1}(Zr_{0.5} Ti_{0.5})_nO_{3n+1}$ according to a layer-by-layer growth technique using pulsed laser deposition.

Four sintered targets A, B, C and D wherein A=(Ba, K, O), B=($ZrO_2$, $TiO_2$), C=(PbO) and D=$Bi_2O_3$ were used.

A/B/C/B/C/B/C/B/A/D was formed, as a fundamental period relative to one unit lattice, on a (001) $SrTiO_3$ (strontium titanate) single crystal substrate, followed by repeating the formation twenty five times to form a thin film.

The growth states of the respective layers A, B, C and D were monitored by in-situ observation through differential-pumping type RHEED (reflection high energy electron diffraction). The intensity oscillations of the reflection spots on a fluorescent plate were measured in real time by use of a CCD camera. This was associated with the laser and a target-changing motor to appropriately control the respective layers.

Laser: an excimer laser was used with a wavelength of 248 nm, and an energy density on the surface of the target ranged from 0.5 to 1 joule/cm², with a repetition rate being 5 Hz.

Oxygen source: ozone generated from an ozone generator was purified through distillation at low temperatures, and the resultant pure ozone gas was blown against the neighborhood of the substrate.

Pressure in a vacuum vessel: set at 0.1 mTorr.

When it was observed that the RHEED intensity oscillations were attenuated, the vacuum deposition was interrupted for 30 seconds in maximum and re-started after confirmation of the return of the intensity. From the RHEED pattern obtained immediately after the formation of a thin film, it was confirmed that the film had four-fold symmetry.

The X-ray diffraction lines from the lattice plane parallel to the substrate plane were measured.

As a result, clear diffraction lines were observed to a range of 2 θ-angles which were greater than in the case using the ordinary thin film growth method shown in Example 2. The stacking of the lattice plane along the direction of c axis was found to be complete.

The diffraction line represented by (00L) was observed from L-1 to L=24, and the length of the c axis was found to be 2.07 nm when determined according to the least square fitting method using the Nelson-Relay method.

EXAMPLE 6

This example illustrates the synthesis of a Bi-layer Perovskite compound where part of the Pb ion is replaced by La and n=2.

A precursor of the formula, $La_2Pb_{1-x}La_xZr_2O_z$, was prepared according to a solid state reaction. Four precursors were prepared as having x=0.02, 0.05, 0.1 and 0.15 in the above formula.

$La_2O_3$, PbO and $ZrO_2$ were pulverized and mixed in an automated mortar at predetermined compositional ratios, followed by pressing in the form of a cylinder and calcination in air at 900° C. for 2 hours.

The above pulverization, mixing, pressing and calcination steps were repeated three times in total to obtain the precursor of the above-indicated formula.

A predetermined amount of $Bi_2O_3$ was added to the precursor, and mixed in a polyethylene pot using zirconia balls in an acetone solvent for 6 hours, followed by drying in air at 200° C. for 2 hours to remove the acetone therefrom. The residue was pressed into a cylinder and calcined in air at 850° C. for 2 hours.

The pulverization and mixing by use of the ball mill, pressing and calcination steps were repeated three times in total. The powder of the resultant synthesized product was pressed at a compression pressure of 2 tons/cm² by use of a cylindrical pressing die to obtain a cylindrical molding having a diameter of 15 mm and a thickness of 30 mm.

The cylindrical molding was sintered while applying a pressure thereto. More particularly, while the cylindrical molding was pressed, the resultant sintered pellet was permitted to orient. Initially, the molding was heated up to 1050° C. at a rate of 200° C./hour and sintered while keeping at the temperature for 2 hours. While further keeping the temperature, the cylindrical molding was along the vertical axis of the cylinder at a pressure of about 0.2 tons/cm². By this, the cylindrical molding was plastically deformed into a flat shape having a thickness reduced to about ⅓.

Finally, the sintered pellet was cooled down to 400° C. at a cooling rate of 200° C./hour and naturally cooled to room temperature to obtain a Bi-layer Perovskite compound.

In the X-ray diffraction pattern of the plane vertical to the direction along which the pressure was applied to, i.e. the plane which became flat by application of the pressure, there were observed (00L) diffraction lines and diffraction lines whose intensity was as low as about 5% of that of the (00L) diffraction line and which were reflected from other lattice planes. On the other hand, in the X-ray diffraction pattern against the plane parallel to the direction along which the pressure was applied to or the side face of the cylindrical molding, diffraction lines from lattice planes other than those of (00L) were predominantly observed.

In view of the above, the application of a pressure during sintering enabled one to form a highly oriented, sintered Bi-layer ferroelectric compound. When the amount, x, of substituted La was 0.1 or below, the Bi-layer Perovskite structure alone was observed. Where x was 0.15, other phases such as of $La_2O_3$ were observed.

EXAMPLE 7

This example illustrates the synthesis of a Bi-layer Perovskite compound wherein part of Zr ion is replaced by Nb or Ta and n=3.

A precursor of the formula, $Pb_2(Zr_{1-x}, M_x)_3O_z$, wherein M is Nb or Ta, and x=0.05, 0.1 or 0.15, was prepared according to a solid state reaction.

PbO, $ZrO_2$, $Nb_2O_5$ and $Ta_2O_5$ were pulverized and mixed in an automated mortar at predetermined compositional ratios, followed by pressing in the form of a cylinder at a compression pressure of about 1 ton/cm² and calcination in air at 900° C. for 2 hours.

The above pulverization, mixing, pressing and calcination steps were repeated three times in total to obtain the precursor having such a composition as indicated above.

$Bi_2O_3$, $BaCO_3$ and $K_2CO_3$ were added to the precursor in amounts sufficient to provide $BiO(Ba_{0.5}, K_{0.5})_2Pb_2(Zr_{1-x}, M_x)_3O_z$, and uniformly mixed in a polyethylene pot using an acetone solvent for the mixing and zirconia balls for about 12 hours.

The resultant mixture was dried in a drying oven at 200° C. for 5 hours and pressed into a cylinder and reacted by thermal treatment in air at 850° C. for 2 hours, followed by pulverization and mixing in an automated mortar. These drying to mixing steps were repeated three times in total.

The powder of the resultant synthesized product was applied with a compression pressure of 2 tons/cm² by use of a cylindrical pressing die to obtain a disk having a diameter of 10 mm and a thickness of 5 mm, followed by sintering in air at 1100° C. for 1 hour thereby obtaining an intended compound.

The resultant compounds were subjected to a powder X-ray diffraction analysis, revealing that with the compounds wherein the amount of substituted Nb or Ta was 0.1 or below, all diffraction lines were assigned to the Bi-layer Perovskite structure and the formed compounds had the Bi-layer Perovskite structure alone.

However, it was confirmed that when x was 0.15, other phases such as of $Ta_2O_5$ and $Nb_2O_5$ were observed as existing in a mixed form.

No difference was recognized in the lattice constants when Nb or Ta was partially substituted. It was confirmed that not only when Nb and Ta were singly mixed, but also when both were mixed at arbitrary ratios, the substitution was likewise ensured. The lattice constants were such that a=0.57 nm and c=1.3 nm for the amount of substitution of x=0.05, and a=0.56 nm and c=1.3 nm for x=0.10.

EXAMPLE 8

In the same manner as in Example 6, sintered products were pellets, and the thin films of given compounds were formed in the same manner as in Example 2. The saturated remanent polarization, coercive field and anisotropy of electromechanical coupling coefficient of the compounds were measured.

The measuring electrode used was one formed by baking a silver paste at 400° C. for sintered pellets, and one formed by vacuum deposition of a platinum electrode on a Bi-layer compound thin film for thin films.

The remanent polarization and the coercive field were, respectively, measured by means of a Sawler-Tower circuit made by us at a frequency of 50 Hz. The electromechanical coupling coefficient was calculated from a measurement determined according to a known resonance-antiresonance method using a commercially available impedance analyzer.

Figure 2:
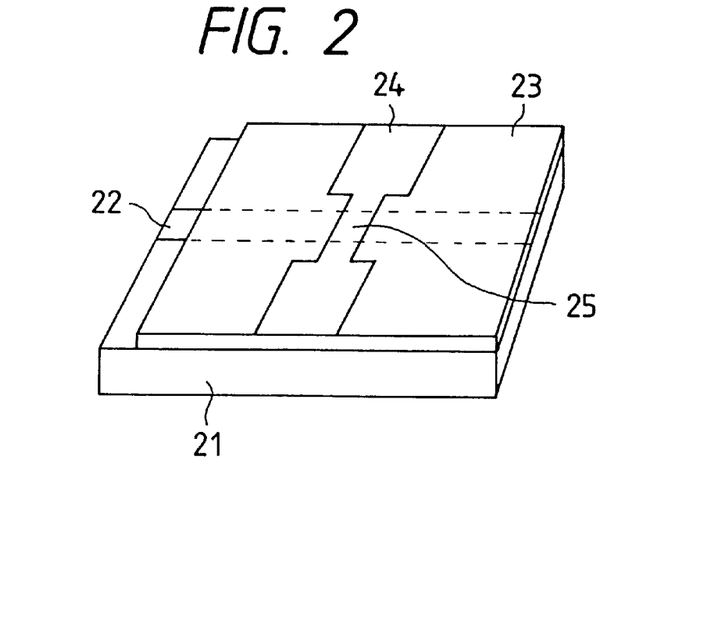
FIG. 2 is a schematic perspective view showing a capacitor structure comprising a BiO-layer ferroelectric compound as a dielectric film.

The composition, form and physical properties of the compounds subjected to the measurements are shown in Table 1. In Table 1, the values which were not exactly corrected with respect to the degree of preferencial orientation are indicated for sintered pellets. The values which were obtained on comparison with other samples having different preferencial orientation are indicated for thin films.

having a size of 10 mm×10 mm and covered with silicon oxide, on which a 200 nm thick platinum film was formed by vacuum deposition, followed by removing unnecessary portions according to an ordinary dry etching process thereby forming a 20 $\mu$m wide lower electrode 22.

Next, a $BiO(La_{0.5})_2Pb_2(Zr_{0.5}, Ti_{0.5})_3O_{10}$ film 23 having a thickness ranging from 150 nm to 200 nm was formed according to a sol-gel method having set out in Example 4 as a ferroelectric film wherein n is 3. During the course of the formation, one end portion of the lower electrode 22 was prevented from immersion with a sol-gel solution, thereby permitting electric connection between the lower electrode 22 and a wiring (not shown) from outside.

After thermal treatment, the capacitor was subjected to X-ray diffraction analysis. The results of the analysis revealed that the $BiO(La_{0.5})_2Pb_2(Zr_{0.5}, Ti_{0.5})_3O_{10}$ film 23 was not substantially oriented.

A 200 nm thick platinum electrode 24 was formed according to a vacuum deposition technique through a metallic mask having a 200 $\mu$m wide space so that it intersected at right angles with the lower electrode 22.

| | Composition: $(BiO)(A'_2)Pb_{n-1}(Zr_{1-x}Ti_x)_nO_y$ | | | | | Remanent Polarization ($\mu C/cm^2$) //c, ⊥c | Coercive Field (KV/cm) //c, ⊥c | Electromechanical Coupling Coefficient ($k_{33}/K_{31}$) |
|---|---|---|---|---|---|---|---|---|
| n | A' | x | La Amount of Substitution | Nb, Ta Amount of substitution | Form | | | |
| 2 | Ba, K | 0 | 0 | 0 | Sintered pellet | —, 28 | —, 7 | 3.8 |
| 2 | Ba, K | 0.5 | 0 | 0 | Sintered pellet | —, 30 | —, 9 | 4.2 |
| 2 | Ba, K | 1.0 | 0 | 0 | Sintered pellet | —, 34 | —, 12 | 3.9 |
| 2 | La | 0 | 0 | 0 | Thin film | —, 48 | —, 8 | 7.2 |
| 2 | La | 0.5 | 0 | 0 | Thin film | —, 52 | —, 8 | 7.3 |
| 2 | La | 1.0 | 0 | 0 | Sintered pellet | —, 31 | —, 12 | 4.1 |
| 3 | Ba, K | 0 | 0 | 0 | Thin film | 7, 40 | 8, 10 | 8.6 |
| 3 | Ba, K | 0.5 | 0 | 0 | Sintered pellet | 10, 28 | 7, 12 | 4.2 |
| 3 | Ba, K | 1.0 | 0 | 0 | Thin film | 4, 47 | 3, 18 | 7.9 |
| 3 | La | 0 | 0 | 0 | Sintered pellet | 7, 23 | 8, 9 | 4.4 |
| 3 | La | 0.5 | 0 | 0 | Sintered pellet | 10, 26 | 7, 12 | 3.9 |
| 3 | La | 1.0 | 0 | 0 | Sintered pellet | 10, 28 | 6, 16 | 4.6 |
| 4 | Ba, K | 0 | 0 | 0 | Thin film | —, 35 | —, 14 | 9.3 |
| 4 | Ba, K | 0.5 | 0 | 0 | Sintered pellet | —, 23 | —, 18 | 5.1 |
| 4 | Ba, K | 1.0 | 0 | 0 | Sintered pellet | —, 27 | —, 20 | 5.2 |
| 4 | La | 0 | 0 | 0 | Thin film | —, 36 | —, 15 | 9.1 |
| 4 | La | 0.5 | 0 | 0 | Thin film | —, 38 | —, 20 | 8.9 |
| 4 | La | 1.0 | 0 | 0 | Sintered pellet | —, 24 | —, 20 | 4.9 |
| 2 | Ba, K | 0.5 | 0.05 | 0 | Sintered pellet | —, 28 | —, 7 | 4.1 |
| 2 | La | 0.5 | 0 | 0.05 | Sintered pellet | —, 26 | —, 6 | 3.9 |
| 3 | Ba, K | 0.5 | 0.05 | 0 | Sintered pellet | 10, 24 | 7, 11 | 3.8 |
| 3 | Ba, K | 0.5 | 0.1 | 0 | Sintered pellet | 14, 22 | 6, 10 | 4.2 |
| 3 | La | 0.5 | 0 | 0.1 | Sintered pellet | 14, 20 | 7, 10 | 4.0 |
| 4 | Ba, K | 0.5 | 0.05 | 0 | Thin film | —, 34 | —, 17 | 5.1 |
| 4 | La | 0.5 | 0 | 0.05 | Thin film | —, 32 | —, 14 | 5.4 |

As shown in Table 1, where n is 2 or 4, no remanent polarization was observed because of the mirror-plate symmetry of the pseudo-Perovskite structure. Little significant differences was seen between the cases where (Ba,K) was used as A' and where La was used. As will be apparent from Table 1, Bi-layer ferroelectrics having desired anisotropy and physical properties can be properly selected, depending on the purpose in end use, among a diversity of compositions.

EXAMPLE 9

This example illustrates the fabrication of a BiO-layer ferroelectric capacitor formed on a silicon substrate and the measurement of a variation in remanent polarization in relation to the variation in polarization hysteresis cycle.

A capacitor structure formed in this example is shown in FIG. 2. In the figure, there is shown a silicon substrate 21

A portion 25 at which the upper electrode 24 and the lower electrode 22 were sterically intersected was made narrower in width than the other portions according to an ordinary electron beam lithography and had a width of 20 $\mu$m.

The electric field was applied between the upper electrode 24 and the lower electrode 22 vertically to the substrate plane, so that an effective electrode area was 20 $\mu$m×20 $\mu$m.

The non-orientation of the ferroelectric thin film 23 reflected on the initial value of the remanent polarization, which was found to be 12 $\mu C/cm^2$.

Figure 3:
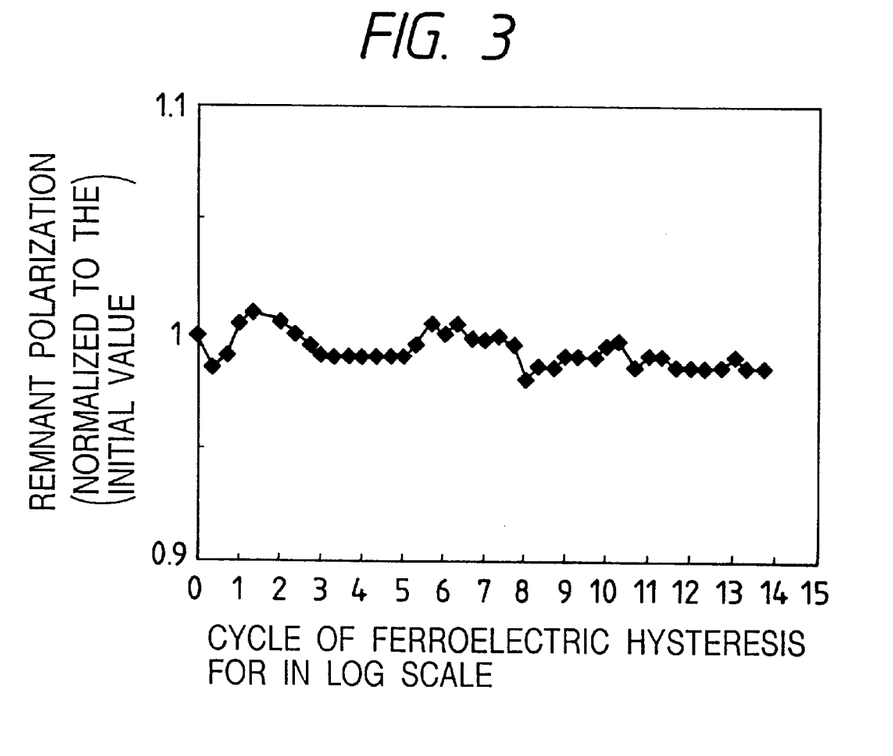
FIG. 3 is a graph showing the relation between the saturated remanent polarization and the logarithm logic of polarization hysteresis cycles.

In the case where the thus fabricated capacitor was subjected to measurement under conditions of an applied voltage of 4.5 V, a frequency of 5 MHz and room temperature, the variation in the value as great as twice the value of saturated remanent polarization of the capacitor is shown in FIG. 3 in relation to the polarization hysteresis cycles. In the figure, the vertical axis indicates normalized remanent polarization when the initial value is taken as 1.

As will be apparent from FIG. 3, any significant lowering of the remanent polarization was not observed within a hysteresis cycle range of $10^{14}$ or below. With respect to the thin films having other compositions, a high characteristic was likewise obtained at least within a range of hysteresis cycles of $10^{14}$ or below.

EXAMPLE 10

This example illustrates the fabrication of a SAW (surface acoustic wave) device using a Bi-layer oxide ferroelectric compound.

Using a method of orienting a sample by application of a compression pressure in a uniaxial direction while sintering as used in Example 6, a flat sample of an oxide ferroelectric compound, $BiO(Ba_{0.5}, K_{0.5})_2Pb_2(Zr_{0.5}, Ti_{0.5})_3O_{10}$, was made.

Figure 4:
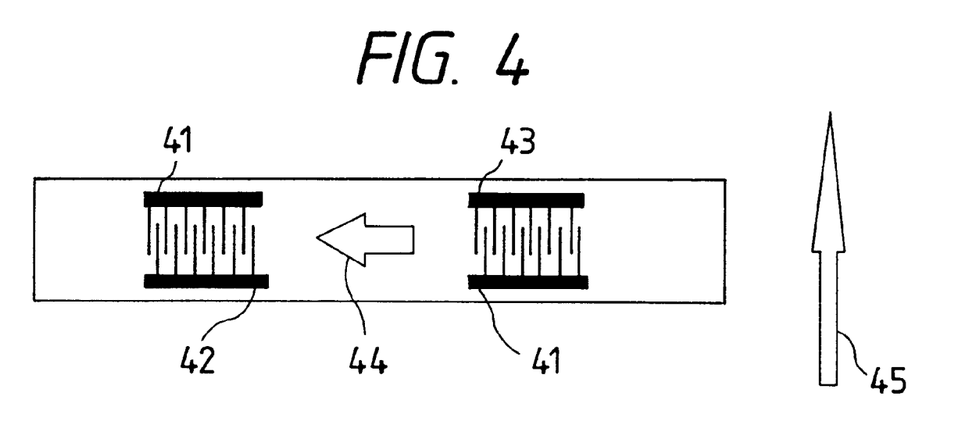
FIG. 4 is a schematic view showing a SAW device using BiO-layer ferroelectric compound.

The flat sample was cut off into a 30 mm long, 6 mm wide and 2.5 mm thick cylindrical sample. The pressure was applied to along the thickness. The cylindrical sample was polarized by application of an electric field of 5 kV/mm for 5 minutes along a direction parallel to the width 45 of the sample as shown in FIG. 4.

Then, two pairs of comb electrodes, each pair having 21 pairs of electrodes at pitch intervals of 400 μm, were formed on the flat surface at a distance of 15 mm in parallel to the axis of polarization.

The electric signals applied to a signal line 43 of an input side transducer converted to a BG (Bleustein-Gulaev) wave transmitted along the length 44. In order to permit this device to work as a delay-line type oscillator, a signal line 42 of an output side transducer was fed back through an amplifier to the signal line 43 of the input side transducer.

As a result, a single mode oscillation (an oscillation of 7 MHz at room temperature) wherein little sprious oscillation was observed. Thus, when using the anisotropy of the crystals, there could be obtained a surface acoustic wave device which was formed at a relatively easy-to-press width to thickness ratio and which made use of BG mode. In FIG. 4, reference numeral 41 indicates a ground line.

As will be apparent from the above, the invention have the following remarkable effects and features.

(1) The Bi-layer Perovskite structure having a BiO-intercalated structure can make use of (Zr, Ti) as the B ion in the pseudo-Perovskite-intercalated structure, thus leading to good ferroelectric characteristics.

(2) On comparison with known Bi-layer structures, the period along the direction of c axis is reduced to half, with good thermodynamic stability.

(3) Ferroelectric characteristics are obtained including anisotropy additionally imparted to $Pb(Zr, Ti)O_3$ as ascribed to the BiO intercalated structure.

(4) The coercive field can be reduced by substitution of part of Pb ion with La ion or part of (Zr, Ti) with (Nb, Ta).

(5) Using a synthetic process using precursors, highly crystalline compounds can be obtained.

(6) By forming a lattice plane vertical to the c axis in every layer unit, more crystalline, oriented thin films can be formed.

We claim:

1. A Bi-layer oxide ferroelectric compound characterized by comprising a fundamental framework consisting of $BO_6$ oxygen octahedra which have a composition represented by the formula, $BiOA'_2Pb_{n-1}(Zr_x, Ti_{1-x})_nO_{3n+1}$ the Bi-layer oxide ferroelectric compound having a structure which comprises a plurality of pseudo-Perovskite layers each having a composition represented by the formula, $A'_2Pb_{n-1}(Zr_x, Ti_{1-x})_nO_{3n+1}$, and a plurality of BiO intermediate layers which are alternately superposed in which n is 2, 3 or 4, A' represents at least one member selected from the group consisting of Ba and K, or La, and $0 \leq x \leq 1$.

2. A Bi-layer oxide ferroelectric compound according to claim 1, characterized in that an elemental ratio of Ba and K is 1:1.

3. A Bi-layer oxide ferroelectric compound according to claim 1, wherein x is 0.5 whereby the elemental ratio of Zr and Ti is 1:1.

4. A Bi-layer oxide ferroelectric compound according to claims 1, characterized in that said Pb is substituted with La by an amount not greater than 10%.

5. A Bi-layer oxide ferroelectric compound according to claim 1, characterized in that at least one of Zr and Ti is substituted with not greater than 10% of Nb or Ta.

6. A Bi-layer oxide ferroelectric compound according to claim 1, characterized in that A' is a mixture selected from the group consisting of Ba, K and La and said mixture has an average valency of +1.5.

7. A capacitor which comprises a member consisting of a Bi-layer oxide ferroelectric compound defined in claim 1, and upper and lower electrodes sandwiching said member therebetween.

8. An ultrasonic oscillator which comprises an oscillator consisting of a Bi-layer oxide ferroelectric compound defined in claim 1.

9. A method for synthesizing a Bi-layer oxide ferroelectric compound characterized by comprising the steps of forming a precursor having a composition represented by the formula, $Pb_{n-1}(Zr, Ti)_nO_z$, and reacting said precursor by mixing with a Bi oxide and an A' oxide at predetermined compositional ratios to form a Bi-layer oxide ferroelectric compound which comprises a plurality of pseudo-Perovskite layers having a composition represented by the formula, $A'_2Pb_{1-n}(Zr_x, Ti_{1-x})_nO_z$, and BiO intermediate layers, in which n is 2, 3 or 4, A' represents at least one member selected from the group consisting of B and K, or La, $0 \leq x \leq 1$ and Z is a value of 3n+1.

10. A method for synthesizing a Bi-layer oxide ferroelectric compound according to claim 9, wherein said pseudo-Perovskite layers and said intermediate layers are alternately stacked.

11. A method for synthesizing a Bi-layer oxide ferroelectric compound according to claim 9, characterized in that the reaction is conducted while irradiating light.

12. A method for synthesizing a Bi-layer oxide ferroelectric compound according to claim 11, characterized in that said light ranges from infrared to ultraviolet region.

13. A method for synthesizing a Bi-layer oxide ferroelectric compound according to claim 11, characterized in that said light is discontinuously irradiated.

14. A method for synthesizing a Bi-layer oxide ferroelectric compound according to claim 9, characterized in that said reaction comprises a thermal treatment after application of a pressure.

15. A Bi-layer oxide ferroelectric compound according to claim 3, characterized in that said Pb is substituted with La by an amount not greater than 10%.

16. A Bi-layer oxide ferroelectric compound according to claim 15, characterized in that at least one of Zr and Ti is substituted with not greater than 10% of Nb or Ta.

17. A Bi-layer oxide ferroelectric compound according to claim 16, characterized in that A' is a mixture selected from the group consisting of Ba, K and La and said mixture has an average valency of +1.5.

18. A capacitor which comprises a member consisting of a Bi-layer oxide ferroelectric compound defined in claim 17, and upper and lower electrodes sandwiching said member therebetween.

19. An ultrasonic oscillator which comprises an oscillator consisting of a Bi-layer oxide ferroelectric compound defined in claim 17.

20. A Bi-layer oxide ferroelectric compound according to claim 4, characterized in that at least one of Zr and Ti is substituted with not greater than 10% of Nb or Ta.

21. A Bi-layer oxide ferroelectric compound according to claim 5, characterized in that A' is a mixture selected from the group consisting of Ba, K and La and said mixture has an average valency of +1.5.

22. A Bi-layer oxide ferroelectric compound according to claim 4, characterized in that A' is a mixture selected from the group consisting of Ba, K and La and said mixture has an average valency of +1.5.

23. A Bi-layer oxide ferroelectric compound according to claim 3, characterized in that A' is a mixture selected from the group consisting of Ba, K and La and said mixture has an average valency of +1.5.

24. A capacitor which comprises a member consisting of a Bi-layer oxide ferroelectric compound defined in claim 5, and upper and lower electrodes sandwiching said member therebetween.

25. A capacitor which comprises a member consisting of a Bi-layer oxide ferroelectric compound defined in claim 4, and upper and lower electrodes sandwiching said member therebetween.

26. A capacitor which comprises a member consisting of a Bi-layer oxide ferroelectric compound defined in claim 3, and upper and lower electrodes sandwiching said member therebetween.

27. An ultrasonic oscillator which comprises an oscillator consisting of a Bi-layer oxide ferroelectric compound defined in claim 5.

28. An ultrasonic oscillator which comprises an oscillator consisting of a Bi-layer oxide ferroelectric compound defined in claim 4.

29. An ultrasonic oscillator which comprises an oscillator consisting of a Bi-layer oxide ferroelectric compound defined in claim 3.

30. A method for synthesizing a Bi-layer oxide ferroelectric compound according to claim 12, characterized in that said light is discontinuously irradiated.

31. A Bi-layer oxide ferroelectric compound according to claim 1, wherein the $BO_6$ oxygen octahedra located above one of the intermediate layers is positioned just above the $BO_6$ oxygen octahedra located beneath said one of the intermediate layers.

32. A Bi-layer oxide ferroelectric compound according to claim 1, wherein A' of the pseudo-Perovskite layers is adjacent the intermediate layers.

33. A Bi-layer oxide ferroelectric compound according to claim 32, wherein Pb in the pseudo-Perovskite layers is surrounded by the $BO_6$ oxygen octahedra.

34. A Bi-layer oxide ferroelectric compound according to claim 1, wherein Pb in the pseudo-Perovskite layers is surrounded by the $BO_6$ oxygen octahedra.

35. A Bi-layer oxide ferroelectric compound according to claim 1, where La occupies one-half of A' ion sites of the pseudo-Perovskite structure, leaving the other one-half as lattice defects.

36. A Bi-layer oxide ferroelectric compound according to claim 1, wherein a lattice constant thereof is in a range of 0.55 to 0.58.

37. A method for synthesizing a Bi-layer oxide ferroelectric compound characterized by comprising the steps of forming a precursor having a composition represented by the formula $A'_2Pb_{n-1}(Zr, Ti)_nO_z$ and reacting said precursor by mixing with a Bi oxide at a predetermined compositional ratio to form a Bi-layer oxide ferroelectric compound which comprises a plurality of pseudo-Perovskite layers having a composition represented by the formula $A'_2Pb_{1-n}(Zr_x, Ti_{1-x})_nO_z$, and BiO intermediate layers, in which n is 2, 3 or 4, A' represents at least one member selected from the group consisting of B and K, or La, $0 \leq x \leq 1$, and z is a value of $3n+1$.

\* \* \* \* \*